US011531835B2

(12) United States Patent
Lee

(10) Patent No.: US 11,531,835 B2
(45) Date of Patent: Dec. 20, 2022

(54) ELECTRONIC DEVICE FOR CONTROLLING PREDEFINED FUNCTION BASED ON RESPONSE TIME OF EXTERNAL ELECTRONIC DEVICE ON USER INPUT, AND METHOD THEREOF

(71) Applicant: SAMSUNG ELECTRONICS CO., LTD., Suwon-si (KR)

(72) Inventor: Dongyul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 16/352,077

(22) Filed: Mar. 13, 2019

(65) Prior Publication Data
US 2019/0286941 A1 Sep. 19, 2019

(30) Foreign Application Priority Data
Mar. 14, 2018 (KR) .................. 10-2018-0029786

(51) Int. Cl.
*H04M 1/72403* (2021.01)
*G06K 9/62* (2022.01)
(Continued)

(52) U.S. Cl.
CPC .......... *G06K 9/6256* (2013.01); *G06N 3/0454* (2013.01); *G06N 3/08* (2013.01)

(58) Field of Classification Search
CPC ......... H04M 1/72448; H04M 1/72451; H04M 1/72454; H04M 1/72463; H04M 1/72466;
(Continued)

(56) References Cited

U.S. PATENT DOCUMENTS

2007/0276651 A1* 11/2007 Bliss .................. G10L 15/30
704/9
2010/0004930 A1 1/2010 Strope et al.
(Continued)

FOREIGN PATENT DOCUMENTS

| EP | 2 975 516 | 6/2015 |
| KR | 10-2006-0089288 | 8/2006 |
| WO | 2010/025440 | 3/2010 |

OTHER PUBLICATIONS

Search Report and Written Opinion dated Jun. 20, 2019 in counterpart International Patent Application No. PCT/KR2019/002913.
(Continued)

*Primary Examiner* — Huy C Ho
(74) *Attorney, Agent, or Firm* — Nixon & Vanderhye P.C.

(57) ABSTRACT

Various embodiments of the disclosure relate to an electronic device for controlling a predefined function based on a response time of an external electronic device on a user input, and a method thereof. The electronic device includes: a memory configured to store one or more applications; a communication module comprising communication circuitry configured to communicate with an external electronic device; and a processor, wherein the processor is configured to control the electronic device to: receive an input; generate first control data for controlling at least one application among the one or more applications using a first recognition method based at least on the input; transmit at least part of the input to the external electronic device through the communication module, wherein the external electronic device is configured to generate second control data for controlling the at least one application using a second recognition method based at least on the input; identify a time that passes until the second control data is received after the at least part of the input is transmitted to the external electronic device; control the at least one
(Continued)

application using the first control data based on the passing time satisfying a first predefined condition; and control the at least one application using the second control data based on the passing time satisfying a second predefined condition.

18 Claims, 11 Drawing Sheets

(51) Int. Cl.
*G06N 3/08* (2006.01)
*G06N 3/04* (2006.01)

(58) Field of Classification Search
CPC ......... H04M 1/72469; H04M 1/72403; H04M 1/72406; H04M 1/72412; H04M 1/72415; H04W 8/245; H04W 24/02; H04W 88/02; G06K 9/6256; G06K 9/629; G06N 3/0454; G06N 3/08; G10L 15/32; G06V 10/764; G06V 10/806; G06V 10/82; G06F 9/44
USPC ........................................................ 455/418
See application file for complete search history.

(56) References Cited

U.S. PATENT DOCUMENTS

| | | |
|---|---|---|
| 2011/0238415 A1 | 9/2011 | Koll |
| 2012/0179457 A1 | 7/2012 | Newman et al. |
| 2012/0179471 A1 | 7/2012 | Newman et al. |
| 2014/0257803 A1 | 9/2014 | Yu et al. |
| 2014/0257804 A1 | 9/2014 | Li et al. |
| 2018/0032915 A1* | 2/2018 | Nagaraju ............... G06V 10/94 |

OTHER PUBLICATIONS

European Search Report and Written Opinion dated Feb. 4, 2021 in corresponding European Application No. 19767202.5.
Park et al., "Big/Little Deep Neural Network for Ultra Low Power Inference", IEEE, 2015, pp. 124-132.
DeConinck et al., "Distributed neural networks for Internet of Things the Big-Little approach", International Internet of Things Symposium, Conference Paper, 2016, 9 pages.
Iandola et al., "SqueezeNet: Alexnet-Level Accuracy With 50X Fewer Parameters and <0.5MB Model Size", Under review as a conference paper at ICLR 2017, Nov. 4, 2016, 13 pages.
Korean Office Action dated May 31, 2022 for KR Application No. 10-2018-0029786.

* cited by examiner

ELECTRONIC DEVICE FOR CONTROLLING PREDEFINED FUNCTION BASED ON RESPONSE TIME OF EXTERNAL ELECTRONIC DEVICE ON USER INPUT, AND METHOD THEREOF

CROSS-REFERENCE TO RELATED APPLICATION

This application is based on and claims priority under 35 U.S.C. § 119 to Korean Patent Application No. 10-2018-0029786, filed on Mar. 14, 2018, in the Korean Intellectual Property Office, the disclosure of which is incorporated by reference herein in its entirety.

BACKGROUND

Field

The disclosure relates to an electronic device for controlling a predefined function based on a response time of an external electronic device on a user input, and a method thereof.

Description of Related Art

Electronic devices (for example, mobile terminals, smartphones, wearable devices, or the like) provide various functions. For example, smartphones provide a short-range wireless communication (for example, Bluetooth, Wi-Fi, or near field communication (NFC), or the like) function, a mobile communication ($3^{rd}$ generation (3G), 4G 5G or the like) function, a music or video replay function, a shooting function, or a navigation function, in addition to a basic voice communication function.

In recent years, interests in artificial intelligence (AI) are increasing. A recognition rate of AI increases as machines are more trained and determine by themselves, and are used. AI involves an unsupervised learning model which uses an algorithm for classifying/learning features of input data by itself, and a supervised learning network model using trained data, and may be configured by element technologies which describe functions such as recognition, determination, or the like of the human brain.

The element technologies may include at least one of language understanding technology for recognizing human language/text, visual understanding technology for recognizing things like human vision, inference/prediction technology for inferring and predicting logically by determining information, knowledge representation technology for processing human experiment information as knowledge data, and operation control technology for controlling automatic driving of vehicles, motions of robots, or the like.

The above information is presented as background information only to assist with an understanding of the disclosure. No determination has been made, and no assertion is made, as to whether any of the above might be applicable as prior art with regard to the disclosure.

SUMMARY

It is common that AI is included in a relatively high-performance external electronic device (for example, a server), rather than in an electronic device, due to complicated calculation and/or excessive throughput. For example, an electronic device may receive a user input and transmit the received user input to an external electronic device, and may receive a response (for example, a result of analyzing (predicting) by AI on the user input) to the user input from the external electronic device.

Since the user input is analyzed using AI included in the external electronic device, the electronic device may have a limitation according to a communication state with the external electronic device or a load state of the external electronic device. For example, when a communication state between the electronic device and the external electronic device is poor or an excessive load is generated in the external electronic device (for example, when analysis of user input is requested from a plurality of electronic devices), the electronic device may receive the result of analyzing very late or may fail to receive the result of analyzing.

Various example embodiments of the disclosure are provided to address the above-described problems and analyze a user input at an electronic device and an external electronic device, respectively, and control at least one application and/or a predefined function using one of the results of the analyzing, based on a response time of the external electronic device.

According to various example embodiments of the disclosure, an electronic device may include, for example: a memory configured to store one or more applications; a communication module comprising communication circuitry configured to communicate with an external electronic device; and a processor, wherein the processor is configured to control the electronic device to: receive an input of a user; generate first control data for controlling at least one application among the one or more applications using a first recognition method based at least on the input; transmit at least part of the input to the external electronic device through the communication module, wherein the external electronic device is configured to generate second control data for controlling the at least one application using a second recognition method based at least on the input; identify (determine) a time that passes until the second control data is received after the at least part of the input is transmitted to the external electronic device; control the at least one application using the first control data based on the passing time satisfying a first predefined condition; and control the at least one application using the second control data based on the passing time satisfying a second predefined condition.

According to example various embodiments of the disclosure, an electronic device may include, for example: a communication module comprising communication circuitry configured to communicate with an external electronic device; and a processor, wherein the processor is configured to control the electronic device to: receive an input of a user; generate first control data using a first recognition method based at least on the input; transmit at least part of the input to the external electronic device through the communication module, wherein the external electronic device is configured to generate second control data using a second recognition method based at least on the input; identify (determine) a time that passes until the second control data is received after the at least part of the input is transmitted to the external electronic device; control a first predefined function using the first control data based on the passing time satisfying a first predefined condition; and control a second predefined function using the second control data based on the passing time satisfying a second predefined condition.

According to various example embodiments of the disclosure, a method of an electronic device may include, for example: receiving an input of a user; generating first control data for controlling at least one application among one or more applications using a first recognition method based at least on the input; transmitting at least part of the input to an external electronic device through a communication module, wherein the external electronic device is configured to generate second control data for controlling the at least one application using a second recognition method based at least on the input; identifying a time that passes until the second control data is received after the at least part of the input is transmitted to the external electronic device; controlling the at least one application using the first control data in response to the passing time satisfying a first predefined condition; and controlling the at least one application using the second control data in response to the passing time satisfying a second predefined condition.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
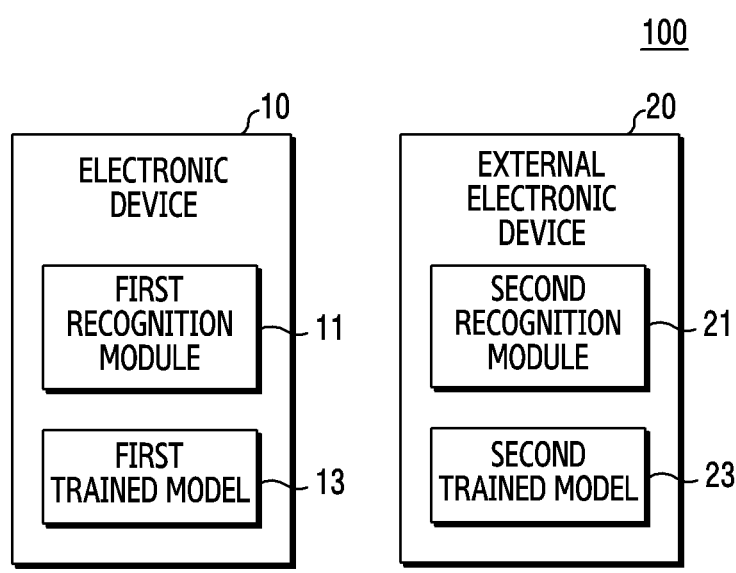
FIG. 1 is a diagram illustrating an example system for recognizing a user input according to an embodiment of the disclosure.

Various example embodiments of the disclosure will be described in greater detail below with reference to the accompanying drawings. Although specific embodiments are illustrated in the drawings and relevant detailed descriptions are provided, this does not limit various example embodiments of the disclosure to a specific form. For example, it may be apparent to a person skilled in the art that various changes can be made to various embodiments of the disclosure.

FIG. 1 is a diagram illustrating an example system for recognizing a user input according to an embodiment of the disclosure.

Referring to FIG. 1, the system 100 according to an embodiment of the disclosure may include an electronic device 10 and an external electronic device 20.

The electronic device 10 according to an embodiment of the disclosure may, for example, and without limitation, be a smartphone, a wearable device, a tablet personal computer (PC), or the like.

The electronic device 10 according to an embodiment of the disclosure may receive a user input through various input devices. For example, the electronic device 10 may receive a user voice through a microphone. According to an example embodiment, the electronic device 10 may receive a user input requesting recognition of an image obtained through a camera or a stored image. According to an example embodiment, the electronic device 10 may receive a text input through a physical keyboard or a virtual keypad. According to an example embodiment, the electronic device 10 may receive a writing input through an electronic pen or a touch screen.

The electronic device 10 according to an embodiment of the disclosure may predict a user's demand by analyzing the user input, and may control at least one application using the result of predicting. For example, the electronic device 10 may predict a user's demand by analyzing the user input using a first trained model 13 which is trained through a first recognition module 11. According to an example embodiment, the first recognition module 11 may generate first control data for controlling at least one application among one or more applications using a first recognition method.

The first recognition module (e.g., including processing circuitry and/or executable program elements) 11 may be an AI module (for example, an artificial neural network). The first recognition module 11 may have a high processing speed, but may have low accuracy in comparison to a second recognition module (e.g., including processing circuitry and/or executable program elements) 21. For example, the number of neural networks, a size of a used memory, and/or the number of multiply-and-accumulate (MAC) operations in the first recognition module 11 may be a predefined multiple or more (for example, 50 times) smaller than in the second recognition module 21. The first recognition module 11 may be included in an electronic device of a low specification or a low performance (for example, a smartphone, a tablet PC). The first trained model 13 may be data that is trained by the first recognition module 11 through an AI algorithm such as, for example, and without limitation, machine learning, neural network, gene, deep learning, classification algorithm, or the like.

The electronic device 10 according to an embodiment of the present disclosure may transmit at least part of the user input to the external electronic device 20. For example, the electronic device 10 may transmit at least part of the user input to the external electronic device 20 through a communication module (not shown), such that the external electronic device 20 generates second control data using a second recognition method based at least on the user input. The second control data may be data for controlling at least one application among one or more applications.

The electronic device 10 according to an embodiment of the disclosure may select one of the first control data or the second control data, based on a time until the second control data is received from the external electronic device 20, and may control at least one application based on the selected control data.

According to an example embodiment, the electronic device 10 may select one of the first control data or the second control data, and may control one of a first predefined function or a second predefined function based on the selected control data. For example, when the second control data is not received within a predefined time, the electronic device 10 may perform the first predefined function using the first control data. On the other hand, when the second control data is received within the predefined time, the electronic device 10 may perform the second predefined function using the second control data.

The external electronic device 20 according to an embodiment of the disclosure may be a device (for example, a server) which is able to communicate with the electronic device 10 through a wired and/or wireless network. The external electronic device 20 may receive at least part of the user input from the electronic device 10. The external electronic device 20 may predict a user's demand by analyzing the received at least part of the user input, and may generate the second control data for controlling at least one application using the result of predicting, and may transmit the second control data to the electronic device 10. For example, the external electronic device 20 may predict the user's demand by analyzing the user input using a second trained model 23 which is trained through the second recognition module 21. According to an example embodiment, the second recognition module 21 may generate the second control data for controlling at least one application among one or more applications using the second recognition method.

The second recognition module 21 may be an AI module (e.g., including processing circuitry and/or executable program elements). The second recognition module 21 may have a low processing speed, but may have high accuracy in comparison to the first recognition module 11. For example, the number of neural networks, a size of a used memory, and/or the number of MAC operations in the second recognition module 21 may be a predefined multiple or more (for example, about 50 times) larger than in the first recognition module 11. The second recognition module 21 may be included in an electronic device of a high specification or high performance (for example, a server). The second trained model 23 may be data that is trained by the second recognition module 21 through an AI algorithm such as, for example, and without limitation, machine learning, neural network, gene, deep learning, classification algorithm, or the like.

Figure 2A:
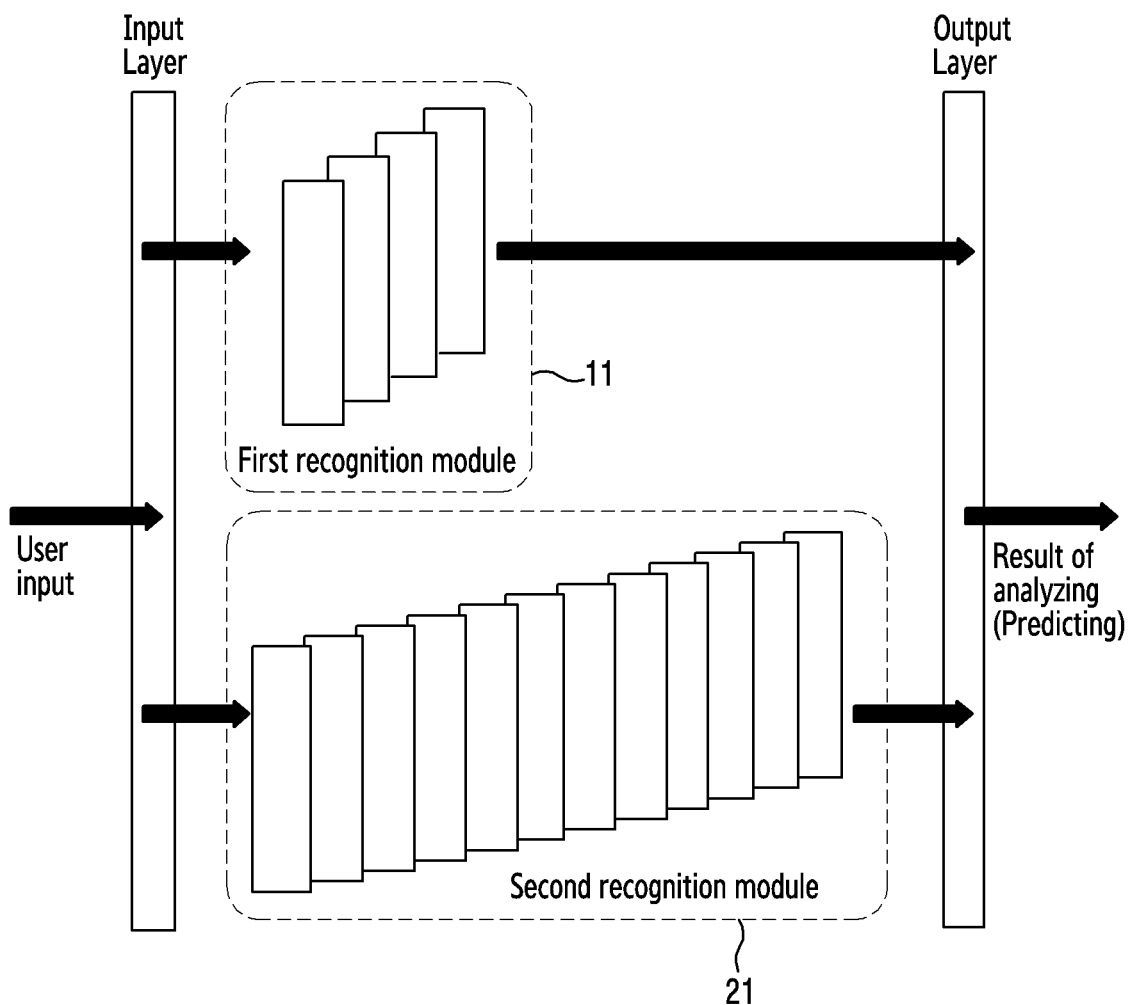
FIG. 2A is a diagram illustrating an example user recognition method of a system according to an embodiment of the disclosure.

FIG. 2A is a diagram illustrating an example user cognition method of a system according to an embodiment of the disclosure.

Referring to FIG. 2A, an input layer according to an embodiment of the disclosure may receive a user input, and may transmit the received user input to the first recognition module 11 and the second recognition module 21, thereby allowing the first recognition module 11 and the second recognition module 21 to analyze the user input altogether. The respective results of analyzing may be transmitted to an output layer, and one of the results may be selected by the output layer. For example, the output layer may select the second analysis result when the result of analyzing by the second recognition module 21 is received within a predefined time, and may select the first analysis result when the result of analyzing by the second recognition module 21 is not received with the predefined time.

An embodiment of the disclosure may analyze the user input through the first recognition module 11 included in the electronic device 10 and the second recognition module 21 included in the external electronic device 20 altogether, such that the analysis result can be always provided within a predefined time, and may control an application or a function according to the analysis result. A more detailed description thereof will be provided below with reference to FIG. 6.

Figure 2B:
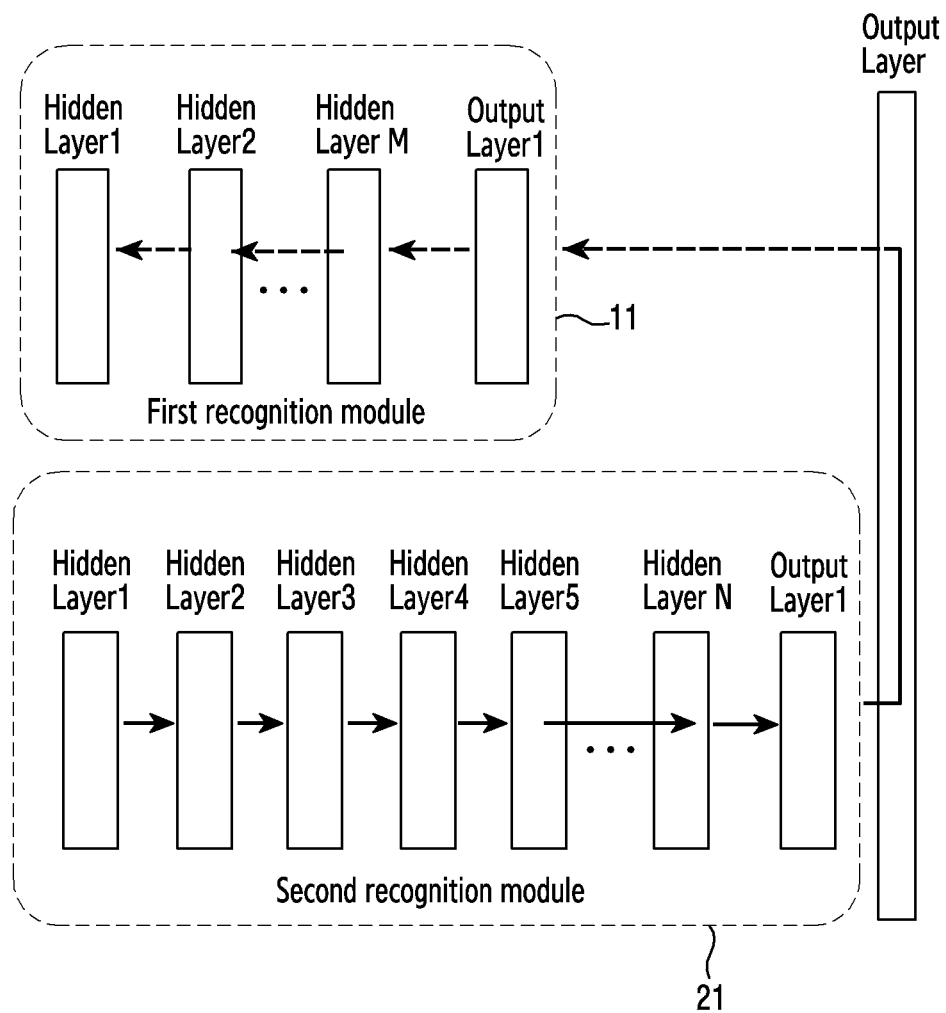
FIG. 2B is a diagram illustrating an example method for refining a trained model of a system according to an embodiment of the disclosure.

FIG. 2B is a diagram illustrating an example method for refining a trained model of a system according to an embodiment of the disclosure.

Referring to FIG. 2B, the result of analyzing by the second recognition module 21 may be provided to the first recognition module 11. For example, when the result of analyzing by the first recognition module 11 and the result of analyzing by the second recognition module 21 are different, the output layer may provide the result of analyzing by the second recognition module 21, which has high accuracy, to the first recognition module 11, thereby training the first recognition module 11. By doing so, the accuracy of the result of analyzing by the first recognition module 11 can be enhanced. A more detailed description thereof will be provided below with reference to FIG. 10.

Figure 3:
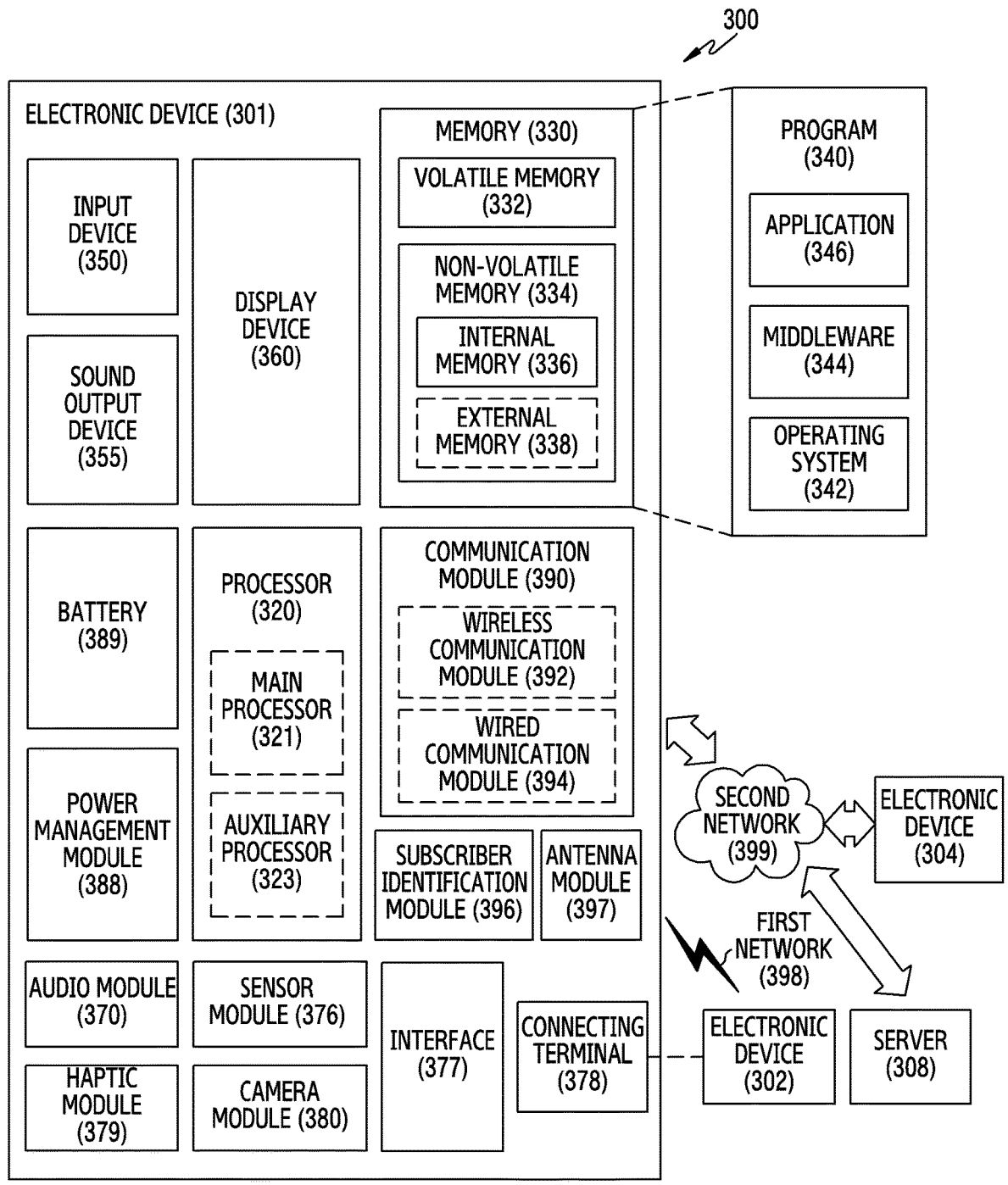
FIG. 3 is a block diagram illustrating an example electronic device in a network environment according to various embodiments of the disclosure.

FIG. 3 is a block diagram illustrating an example electronic device 301 in a network environment 300 according to various embodiments.

Referring to FIG. 3, the electronic device 301 (e.g., an electronic device 10 of FIG. 1) in the network environment 300 may communicate with an electronic device 302 via a first network 398 (e.g., a short-range wireless communication network), or an electronic device 304 or a server 308 (e.g., an external electronic device 20 of FIG. 1) via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB). According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Figure 4:
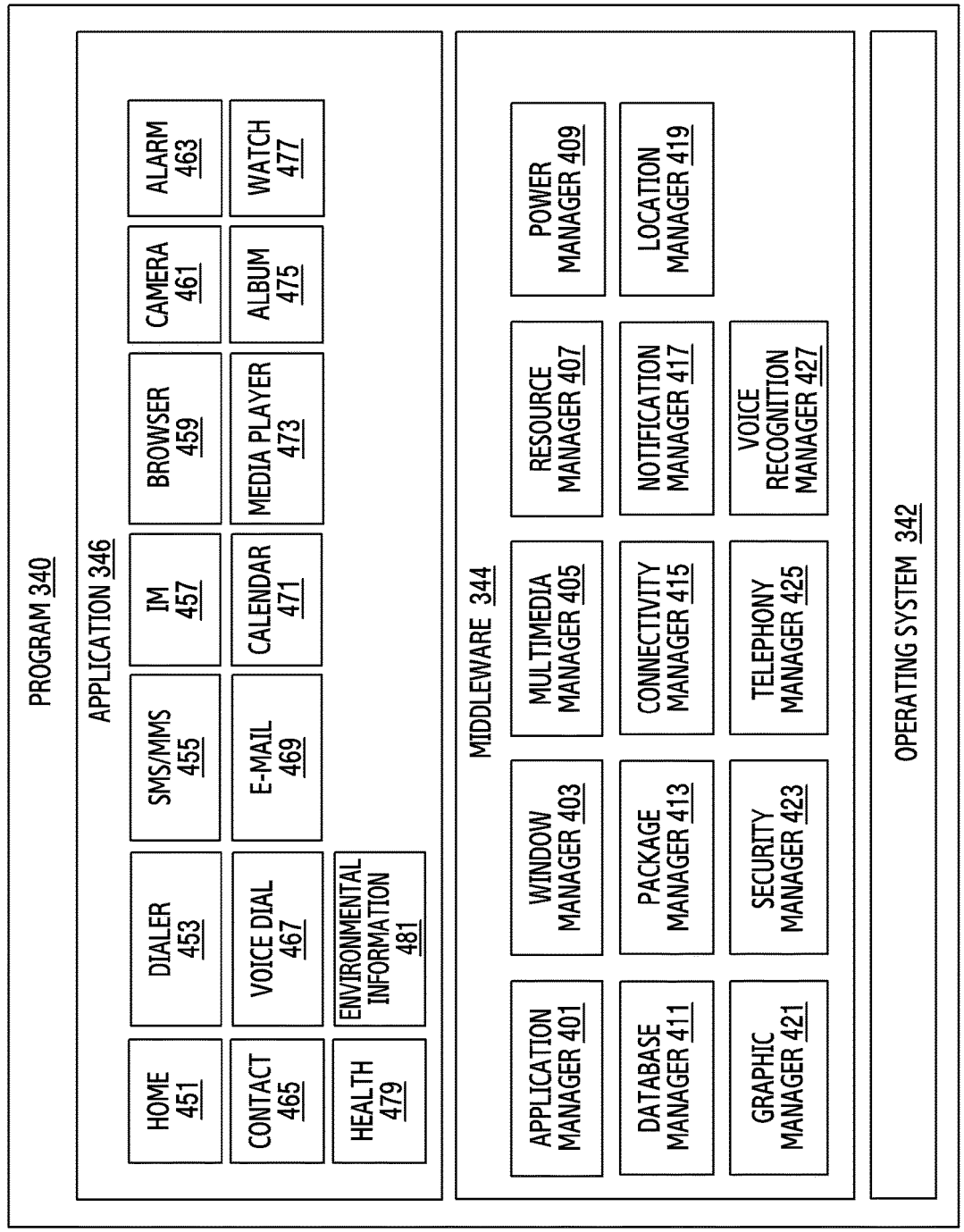
FIG. 4 is a block diagram illustrating an example program according to various embodiments of the disclosure.

FIG. 4 is a block diagram 400 illustrating an example program according to various embodiments of the disclosure.

Referring to FIG. 4, the program 340 according to various embodiments. According to an embodiment, the program 340 may include an operating system (OS) 342 to control one or more resources of the electronic device 301, middleware 344, or an application 346 executable in the OS 342.

The OS 342 may include, for example, Android™, iOS™, Windows™, Symbian™, Tizen™, or Bada™. At least part of the program 340, for example, may be pre-loaded on the electronic device 301 during manufacture, or may be downloaded from or updated by an external electronic device (e.g., the electronic device 302 or 304, or the server 308) during use by a user.

The OS 342 may control management (e.g., allocating or deallocation) of one or more system resources (e.g., process, memory, or power source) of the electronic device 301. The OS 342, additionally or alternatively, may include one or more driver programs to drive other hardware devices of the electronic device 301, for example, the input device 350, the sound output device 355, the display device 360, the audio module 370, the sensor module 376, the interface 377, the haptic module 379, the camera module 380, the power management module 388, the battery 389, the communication module 390, the subscriber identification module 396, or the antenna module 397.

The middleware 344 may provide various functions to the application 346 such that a function or information provided from one or more resources of the electronic device 301 may be used by the application 346. The middleware 344 may include, for example, an application manager 401, a window manager 403, a multimedia manager 405, a resource manager 407, a power manager 409, a database manager 411, a package manager 413, a connectivity manager 415, a notification manager 417, a location manager 419, a graphic manager 421, a security manager 423, a telephony manager 425, or a voice recognition manager 427.

The application manager 401, for example, may manage the life cycle of the application 346. The window manager 403, for example, may manage one or more graphical user interface (GUI) resources that are used on a screen. The multimedia manager 405, for example, may identify one or more formats to be used to play media files, and may encode or decode a corresponding one of the media files using a codec appropriate for a corresponding format selected from the one or more formats. The resource manager 407, for example, may manage the source code of the application 346 or a memory space of the memory 330. The power manager 409, for example, may manage the capacity, temperature, or power of the battery 389, and determine or provide related information to be used for the operation of the electronic device 301 based at least in part on corresponding information of the capacity, temperature, or power of the battery 389. According to an embodiment, the power manager 409 may interwork with a basic input/output system (BIOS) (not shown) of the electronic device 301.

The database manager 411, for example, may generate, search, or change a database to be used by the application 346. The package manager 413, for example, may manage installation or update of an application that is distributed in the form of a package file.

The connectivity manager 415, for example, may manage a wireless connection or a direct connection between the electronic device 301 and the external electronic device. The notification manager 417, for example, may provide a function to notify a user of an occurrence of a specified event (e.g., an incoming call, message, or alert). The location manager 419, for example, may manage locational information on the electronic device 301. The graphic manager 421, for example, may manage one or more graphic effects to be offered to a user or a user interface related to the one or more graphic effects.

The security manager 423, for example, may provide system security or user authentication. The telephony manager 425, for example, may manage a voice call function or a video call function provided by the electronic device 301. The voice recognition manager 427, for example, may transmit a user's voice data to the server 308, and receive, from the server 308, a command corresponding to a function to be executed on the electronic device 301 based at least in part on the voice data, or text data converted based at least in part on the voice data. According to an embodiment, the middleware 444 may dynamically delete some existing components or add new components. According to an embodiment, at least part of the middleware 344 may be included as part of the OS 342 or may be implemented as another software separate from the OS 342.

The application 346 may include, for example, a home 451, dialer 453, short message service (SMS)/multimedia messaging service (MMS) 455, instant message (IM) 457, browser 459, camera 461, alarm 463, contact 465, voice recognition 467, email 469, calendar 471, media player 473, album 475, watch 477, health 479 (e.g., for measuring the degree of workout or biometric information, such as blood sugar), or environmental information 481 (e.g., for measuring air pressure, humidity, or temperature information) application. According to an embodiment, the application 346 may further include an information exchanging application (not shown) that is capable of supporting information exchange between the electronic device 301 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 469) of the electronic device 301 to the external electronic device. Additionally or alternatively, the notification relay application may receive notification information from the external electronic device and provide the notification information to a user of the electronic device 301.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 5:
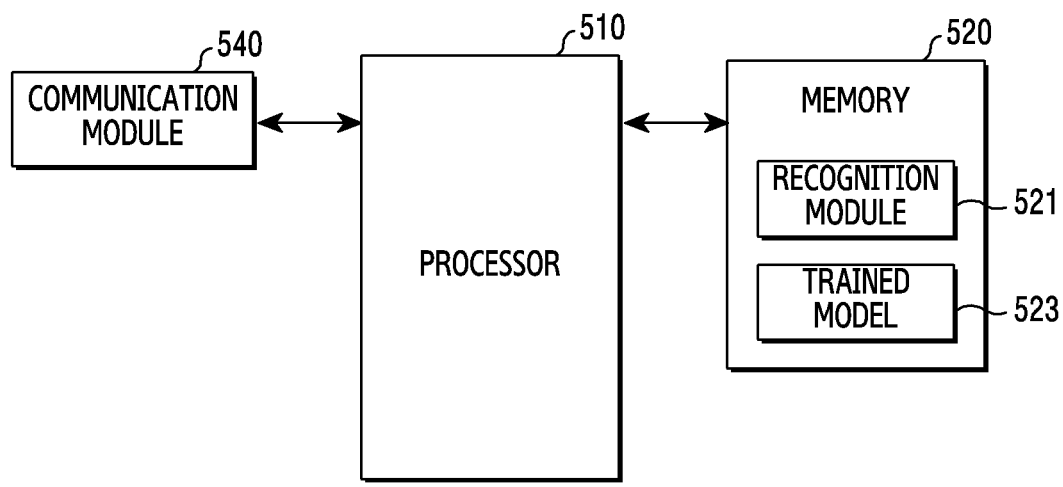
FIG. 5 is a block diagram illustrating an example electronic device according to various embodiments of the disclosure.

FIG. 5 is a block diagram illustrating an example electronic device according to various embodiments of the disclosure.

Referring to FIG. 5, the electronic device 500 (for example, the electronic device 10 of FIG. 1 or the electronic device 301 of FIG. 3) may include a processor (e.g., including processing circuitry) 510 (for example, the processor 320 of FIG. 3), a memory 520 (for example, the memory 330 of FIG. 3), and a communication module (e.g., including communication circuitry) 540 (for example, the communication module 390 of FIG. 3).

The processor 510 may include various processing circuitry and control an overall operation of the electronic device 500. For example, the processor 510 may be operatively (or electrically) connected with the memory 520 and the communication module 540 to control the respective elements of the electronic device 500.

The processor 510 may receive a command or instructions from the memory 520, and may control the respective elements according to the received command or instructions to perform various functions. The processor 510 may include various processing circuitry including, for example, and without limitation, a central processing unit (CPU), an application processor (AP), a micro control unit (MCU), a micro processor unit (MPU), or the like. The processor 510 may be include a single core processor or a multi-core processor. In another embodiment, the processor 510 may be a multi-processor including a plurality of processors. In still another embodiment, the processor 510 may further include a graphic processing unit (GPU) and/or an image signal processor. In yet another embodiment, the processor 510 may configured with a GPU or an image signal processor.

The processor 510 according to an embodiment of the disclosure may control an operation of analyzing (or recognizing) a user input. A more detailed description thereof will be provided below with reference to FIG. 6, FIG. 7, FIG. 8, FIG. 9 and FIG. 10.

The memory 520 may be operatively (or electrically) connected with the processor 510. The memory 520 may store various programs for operating the electronic device 500, and may store data generated during execution of the various programs, or downloaded data. In addition, the memory 520 may store various commands and/or instructions for operating the processor 510.

The memory 520 according to an embodiment of the disclosure may store a recognition module 521 for analyzing a user input, and a trained model 523 which is trained through an AI algorithm. The recognition module 521 and the trained model 523 are similar to the first recognition module 11 and the first trained model 13, and thus a detailed description thereof is omitted.

The memory 520 according to an embodiment of the disclosure may store a time (hereinafter, a default time) (for example, 0.3 second) which is predefined to wait for reception of the result of predicting (or second control data) from an external electronic device. The default time may be changed by a user.

The memory 520 according to an embodiment of the disclosure may store a waiting time according to accuracy of the result of predicting (first control data) by the recognition module 521. For example, the waiting time may be stored as in table 1 presented below:

TABLE 1

| Accuracy > 0.5 (50%) | Waiting time = Default time × 0.5 |
| 0.5 > accuracy > 0.4 | Waiting time = Default time × 0.6 |
| 0.4 > accuracy > 0.3 | Waiting time = Default time × 0.7 |
| 0.3 > accuracy > 0.2 | Waiting time = Default time × 0.8 |
| 0.2 > accuracy > 0.1 | Waiting time = Default time × 0.9 |
| 0.1 > accuracy > 0 | Waiting time = Default time × 1.0 |

Table 1 presented above is merely an example and does not limit embodiments of the disclosure.

The communication module 540 may include various communication circuitry and establish a communication channel with an external electronic device (for example, the external electronic device 20 of FIG. 1). The communication module 540 may transmit at least part of a user input to the external electronic device under control of the processor 510. In addition, the communication module 540 may receive an analysis result (or second control data) of analyzing at least part of the user input from the external electronic device.

Although not shown in FIG. 5, the electronic device 500 may further include at least one other element (for example, a display, a camera, an audio module, etc.) which is equivalent to the above-described elements. The display (for example, the display device 360 of FIG. 3) may, under the control of the processor 510, notify (or inform) that reception of the second control data is delayed when a result of predicting (second control data) is not received from the external electronic device within the default time, and may display a user interface (UI) (for example, a pop-up window) asking whether a user will keep waiting for reception. The camera may obtain an image to be analyzed through the first recognition module 521. The image obtained through the camera may be transmitted to the external electronic device through the communication module 540, and may be analyzed by a second recognition module (for example, the second recognition module 21 of FIG. 1, FIG. 2A, and FIG. 2B).

The audio module may obtain a user's voice through an input device (for example, the input device 350 of FIG. 3) (for example, a microphone). The user's voice obtained through the microphone may be analyzed by the first recognition module 521. In addition, the user's voice obtained through the microphone may be transmitted to the external electronic device through the communication module 540, and may be analyzed by the second recognition module.

According to various embodiments of the disclosure, an electronic device (e.g., an electronic device 10, 301, or 500) may comprise a memory (e.g., a memory 330, or 520) configured to store one or more applications, a communication module comprising communication circuitry (e.g., a communication module 390 or 540) configured to communicate with an external electronic device (e.g., an external electronic device 20 or a server 308), and a processor (e.g., a processor 320 or 510). The processor is configured to control the electronic device to: receive an input of a user, generate first control data for controlling at least one application among the one or more applications using a first recognition method based at least on the input, transmit at least part of the input to the external electronic device through the communication module, wherein the external electronic device comprising circuitry configured to generate second control data for controlling the at least one application using a second recognition method based at least on the input, identify (determine) a time that passes until the second control data is received after the at least part of the input is transmitted to the external electronic device, control the at least one application using the first control data based on the passing time satisfying a first predefined condition, and control the at least one application using the second control data based on the passing time satisfying a second predefined condition.

According to various embodiments, the first recognition method may comprise a first trained model (e.g., a first trained model 13, or a trained model 523) which is trained based at least on a first artificial neural network, and the second recognition method may comprise a second trained model (e.g., a second trained model 23) which is trained based at least on a second artificial neural network.

According to various embodiments, the processor may be further configured to control the electronic device to: determine that the first predefined condition is satisfied, based on the second control data being received after a predefined time or the second control data not being received in response to the at least part of the input being transmitted to the external electronic device through the communication module, and determine that the second predefined condition is satisfied based on the second control data being received within the predefined time in response to the at least part of the input being transmitted to the external electronic device through the communication module.

According to various embodiments, the processor may be further configured to control the electronic device to identify an accuracy of the first control data, and to adjust the predefined time based at least on the accuracy of the first control data.

According to various embodiments, the processor may be further configured to control the electronic device to determine whether the first control data and the second control data are identical to each other in response to the second control data being received after the predefined time, and to refine the first trained model using the second control data as training data of the first recognition method when the first control data and the second control data are not identical to each other.

According to various embodiments, the processor may be further configured to control the electronic device to determine whether the first control data and the second control data are identical to each other in response to the second predefined condition being satisfied, and control the at least one application using the second control data in response to the first control data and the second control data not being identical to each other, and to refine the first trained model using the second control data as training data of the first recognition method.

According to various embodiments, the electronic device further comprises a display (e.g., display device 360). The processor may be further configured to control the display to display a user interface configured to receive an input for requesting whether to wait for reception of the second control data based on the predefined time passing after the at least part of the input is transmitted to the external electronic device through the communication module, and wait for reception of the second data for greater than the predefined time in response to a request for waiting for reception being selected by the user through the user interface.

According to various embodiments, the processor may be further configured to control the electronic device to identify a communication state with the external electronic device, and to not transmit the at least part of the user input to the external electronic device in response to the communication state satisfying a third predefined condition, and to generate the first control data using the first recognition method.

According to various embodiments of the disclosure, an electronic device (e.g., an electronic device 10, 301, or 500) may comprise a communication module comprising communication circuitry (e.g., a communication module 390 or 540) configured to communicate with an external electronic device (e.g., an external electronic device 20 or a server 308), and a processor (e.g., a processor 320 or 510). The processor is configured to control the electronic device to: receive an input of a user, generate first control data using a first recognition method based at least on the input, transmit at least part of the input to the external electronic device through the communication module, wherein the external electronic device comprises circuitry configured to generate second control data using a second recognition method based at least on the input, identify (determine) a time that passes until the second control data is received after the at least part of the input is transmitted to the external electronic device, control a first predefined function using the first control data based on the passing time satisfying a first predefined condition, and control a second predefined function using the second control data based on the passing time satisfying a second predefined condition.

According to various embodiments, the first recognition method may comprise a first trained model (e.g., a first trained model 13, or a trained model 523) which is trained based at least on a first artificial neural network, and the second recognition method may comprise a second trained model (e.g., a second trained model 23) which is trained based at least on a second artificial neural network.

According to various embodiments, the first predefined function and the second predefined function may be identical to each other.

According to various embodiments, based on the first control data and the second control data not being identical to each other, the processor may be further configured to control the second predefined function using the second control data, and to refine the first trained model using the second control data as training data of the first recognition method.

Figure 6:
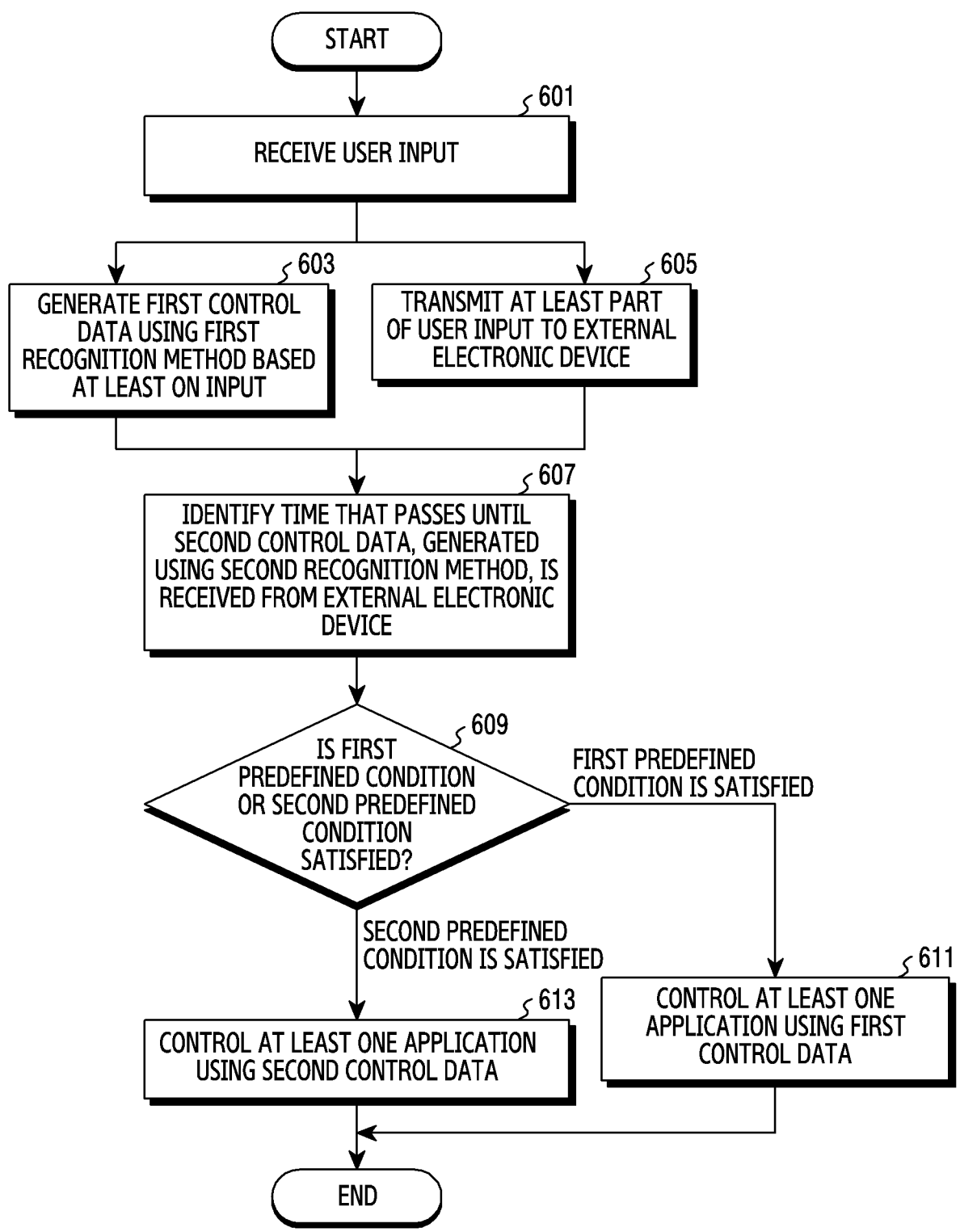
FIG. 6 is a flowchart illustrating an example control method of an electronic device according to an embodiment of the disclosure.

FIG. 6 is a flowchart illustrating an example control method of an electronic device according to an embodiment of the disclosure.

Referring to FIG. 6, a processor (for example, the processor 320 of FIG. 3, or the processor 510 of FIG. 5) of the electronic device (for example, the electronic device 10 of FIG. 1, the electronic device 301 of FIG. 3, the electronic device 500 of FIG. 5) according to an embodiment of the disclosure may receive a user input in operation 601. The user input may be received in various methods. For example, the electronic device may receive a user's voice through a microphone (for example, the input device 350 of FIG. 3). According to an embodiment, the electronic device may receive a user input of requesting recognition of an image obtained through a camera (for example, the camera module 380 of FIG. 3), or a stored image. According to an example embodiment, the electronic device may receive a text input through a physical keyboard or a virtual keypad. According to an example embodiment, the electronic device may receive a writing input through an electronic pen or a touch screen.

In operation 603, the processor according to an embodiment of the present disclosure may generate first control data using a first recognition method, based at least on the input. The first control data may be data for controlling at least one application among one or more applications, and may be generated based at least on the user input. The first recognition method enables a first recognition module (for example, the first recognition module 11 of FIG. 1, FIG. 2A, and FIG. 2B, or the recognition module 521 of FIG. 5) to analyze (or predict) the user input using a first trained model (for example, the first trained model 13 of FIG. 1, or the trained model 523 of FIG. 5). The first recognition module may be an AI module. The first recognition module may have a high processing speed, but may have low accuracy in comparison to the second recognition module. For example, the number of neural networks, a size of a used memory, and/or the number of MAC operations in the first recognition module may be a predefined multiple or more (for example, about 50 times) smaller than in the second recognition module. The first trained model may be data which is trained by the first recognition module through an AI algorithm such as machine learning, neural network, gene, deep learning, classification algorithm, etc.

In operation 605, the processor according to an embodiment of the disclosure may transmit at least part of the user input to an external electronic device (for example, the external electronic device 20 of FIG. 1, or the server 308 of FIG. 3). For example, the processor may transmit at least part of the user input to the external electronic device through a communication module (for example, the communication module 390 of FIG. 3, or the communication module 540 of FIG. 5), such that the external electronic device generates second control data using a second recognition method based at least on the user input. The second control data may be data for controlling at least one application among one or more applications. The second recognition method enables a second recognition module (for example, the second recognition module 21 of FIG. 1, FIG. 2A, and FIG. 2A) to analyze (or predict) the user input using a second trained model (for example, the second trained model 23 of FIG. 1). The second recognition module may be an AI module. The second recognition module may have a low processing speed, but may have high accuracy in comparison to the first recognition module. For example, the number of neural networks, a size of a used memory, and/or the number of MAC operations in the second recognition module may be a predefined multiple or more (for example, about 50 times) larger than in the first recognition module. The second trained model may be data that is trained by the second recognition module through an AI algorithm such as machine learning, neural network, gene, deep learning, classification algorithm, or the like.

Operations 603 and 605 may be performed simultaneously or almost simultaneously in response to the user input being received.

In operation 607, the processor according to an embodiment of the disclosure may identify (or check or determine) a time that passes until the second control data generated using the second recognition method is received from the external electronic device. For example, the processor may count up a time that is taken from the time that at least part of the user input is transmitted to the external electronic device until the time that the second control data is received.

In operation 609, the processor according to an embodiment of the disclosure may determine whether a first predefined condition or a second predefined condition is satisfied.

When the first predefined condition is satisfied (for example, when the second control data is not received within a predefined time or when the second control data is received after the predefined time) as a result of determining in operation 609, the processor may control at least one application using the first control data in operation 611.

When the second predefined condition is satisfied (for example, when the second control data is received within the predefined time) as a result of determining in operation 609, the processor may control at least one application using the second control data in operation 613.

In FIG. 6, it is illustrated that the application is controlled based on the user input. However, embodiments of the disclosure are not limited thereto. According to an embodiment, when the first predefined condition is satisfied, the electronic device according to an embodiment of the disclosure may control a first predefined function using the first control data, and, when the second predefined condition is satisfied, the electronic device may control a second predefined function using the second control data. The first predefined function and the second predefined function may be the same.

Figure 7:
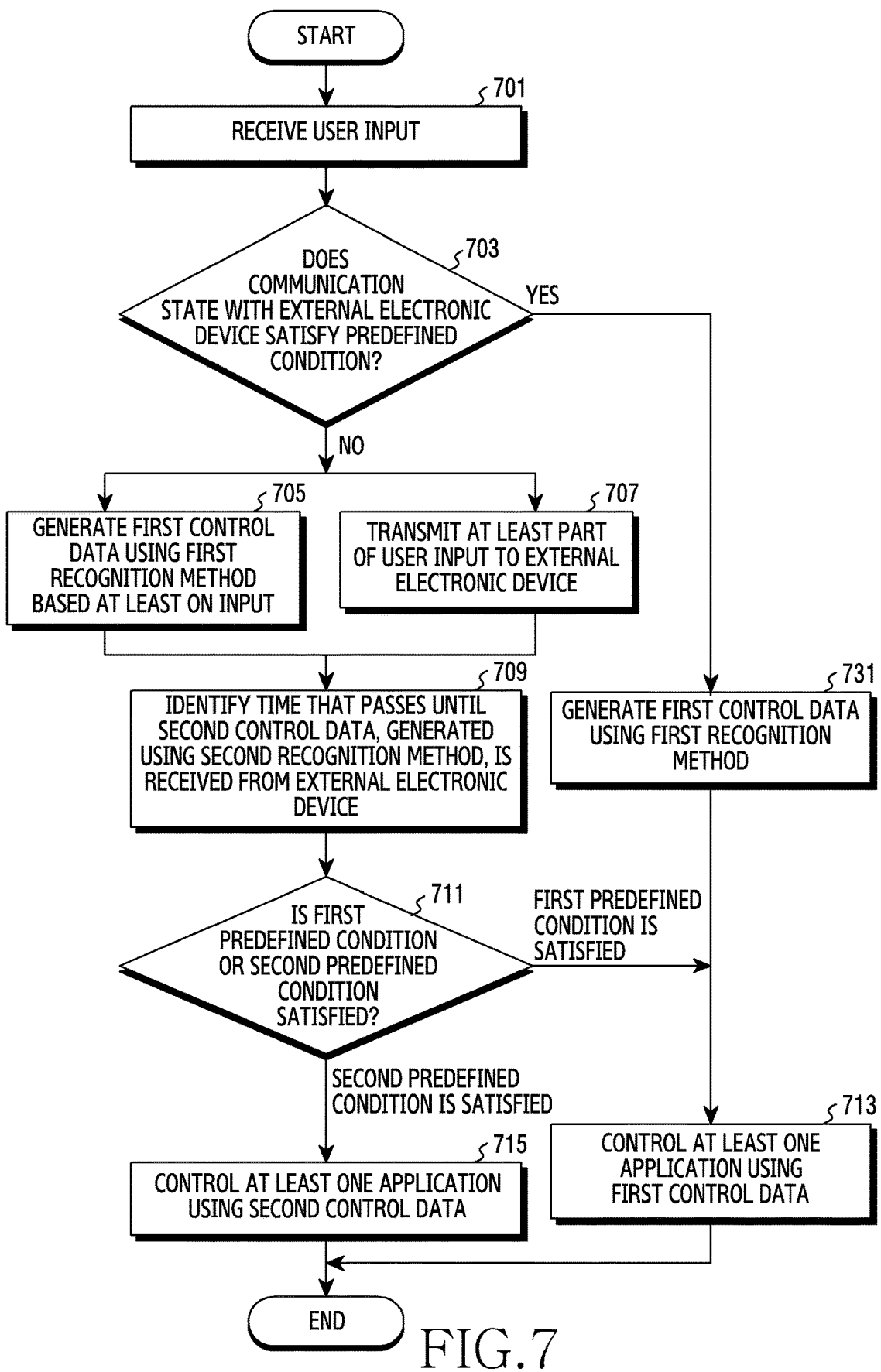
FIG. 7 is a flowchart illustrating an example control method of an electronic device according to an embodiment of the disclosure.

FIG. 7 is a flowchart illustrating an example control method of an electronic device according to an embodiment of the disclosure.

Referring to FIG. 7, a processor (for example, the processor 320 of FIG. 3, or the processor 510 of FIG. 5) of the electronic device (for example, the electronic device 10 of FIG. 1, the electronic device 301 of FIG. 3, the electronic device 500 of FIG. 5) according to an embodiment of the disclosure may receive a user input in operation 701. The user input may be received in various methods.

In operation 703, the processor according to an embodiment of the disclosure may determine whether a communication state with an external electronic device (for example, the external electronic device 20 of FIG. 1, the server 308 of FIG. 3) satisfies a predefined condition (hereinafter, a third predefined condition). The third predefined condition may be a condition in which communication between the electronic device and the external electronic device is impossible, or a communication speed is very low (for example, a reception signal strength of Wi-Fi or mobile communication is less than (or less than or equal to) a predefined value (for example, about −100 dBm)).

According to an embodiment of the disclosure, when the processor is set to use only a Wi-Fi network, the processor may identify a communication state with the external electronic device through a Wi-Fi network. In another example, when the processor is set to use a Wi-Fi network and a mobile communication network (Wi-Fi+cellular), the processor may identify a communication state with the external electronic device through the Wi-Fi network, first, and, when the communication through the Wi-Fi network is impossible or a reception signal strength of the Wi-Fi network is less than a predefined value (for example, about −100 dBm), the processor may identify a communication state with the external electronic device through the mobile communication network.

When the communication state with the external electronic device does not satisfy the third predefined condition (for example, when communication with the external electronic device is possible) as a result of determining in operation 703, the processor may perform operations 705, 707, 709, 711, 713, and 715. Operations 705 to 715 may correspond to operations 603 to 613 of FIG. 6, respectively. Accordingly, a detailed description of operations 705 to 715 will not be repeated here.

When the communication state with the external electronic device satisfies the third predefined condition (for example, when communication with the external electronic device is impossible) as a result of determining in operation 703, the processor may generate first control data using a first recognition method in operation 731. In this example, since communication is impossible, the processor may not transmit at least part of the user input to the external electronic device. When generation of the first control data is completed, the processor may proceed to operation 713.

Figure 8:
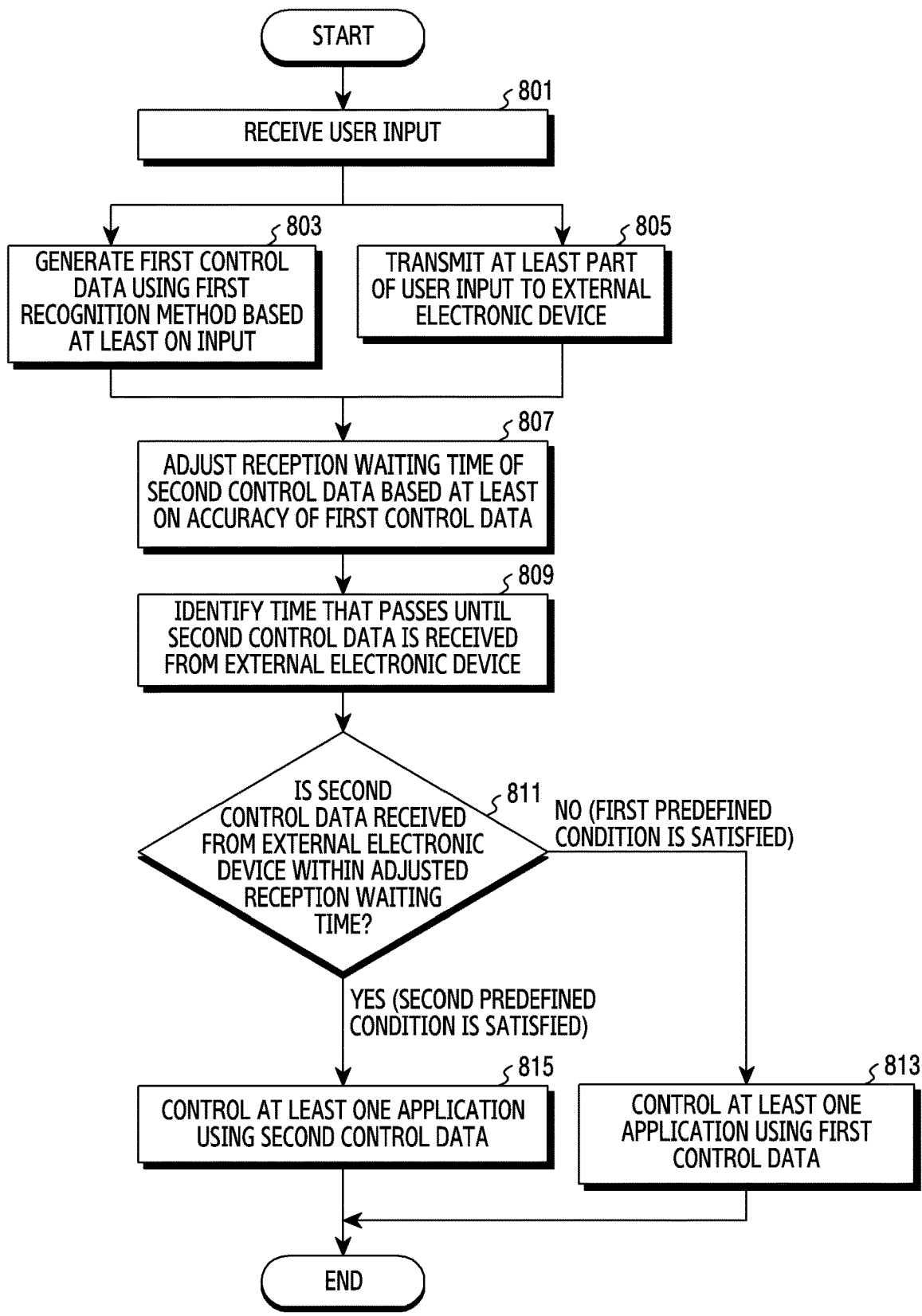
FIG. 8 is a flowchart illustrating an example control method of an electronic device according to an embodiment of the disclosure.

FIG. 8 is a flowchart illustrating an example control method of an electronic device according to an embodiment of the disclosure.

Referring to FIG. 8, a processor (for example, the processor 320 of FIG. 3, or the processor 510 of FIG. 5) of the electronic device (for example, the electronic device 10 of FIG. 1, the electronic device 301 of FIG. 3, or the electronic device 500 of FIG. 5) according to an embodiment of the disclosure may perform operations 801, 803, and 805 similarly to operations 601, 603, and 605 of FIG. 6.

In operation 807, the processor according to an embodiment of the disclosure may adjust (or determine) a reception waiting time of the second control data, based at least on accuracy (for example, probability) of the first control data. For example, as shown in table 1, the processor may identify the accuracy of the first control data, and, when the accuracy of the first control data is higher than or equal to about 50%, the processor may adjust the reception waiting time to a default waiting time (for example, 0.3 second) times 0.5.

When the accuracy is greater than or equal to about 40% and less than about 50%, the processor may adjust the reception waiting time to the default waiting time times 0.6.

When the reception waiting time is adjusted, the processor may identify a time until the second control data is received from the external electronic device (for example, the external electronic device 20 of FIG. 1, the server 308 of FIG. 3) in operation 809.

In operation 811, the processor according to an embodiment of the disclosure may determine whether the second control data is received from the external electronic device within the adjusted reception waiting time.

When the second control data is not received within the determined reception waiting time (when the first predefined condition is satisfied) as a result of determining in operation 811, the processor may control at least one application using the first control data in operation 813.

When the second control data is received within the determined reception waiting time (when the second predefined condition is satisfied) as a result of determining in operation 811, the processor may control at least one application using the second control data in operation 815.

Figure 9:
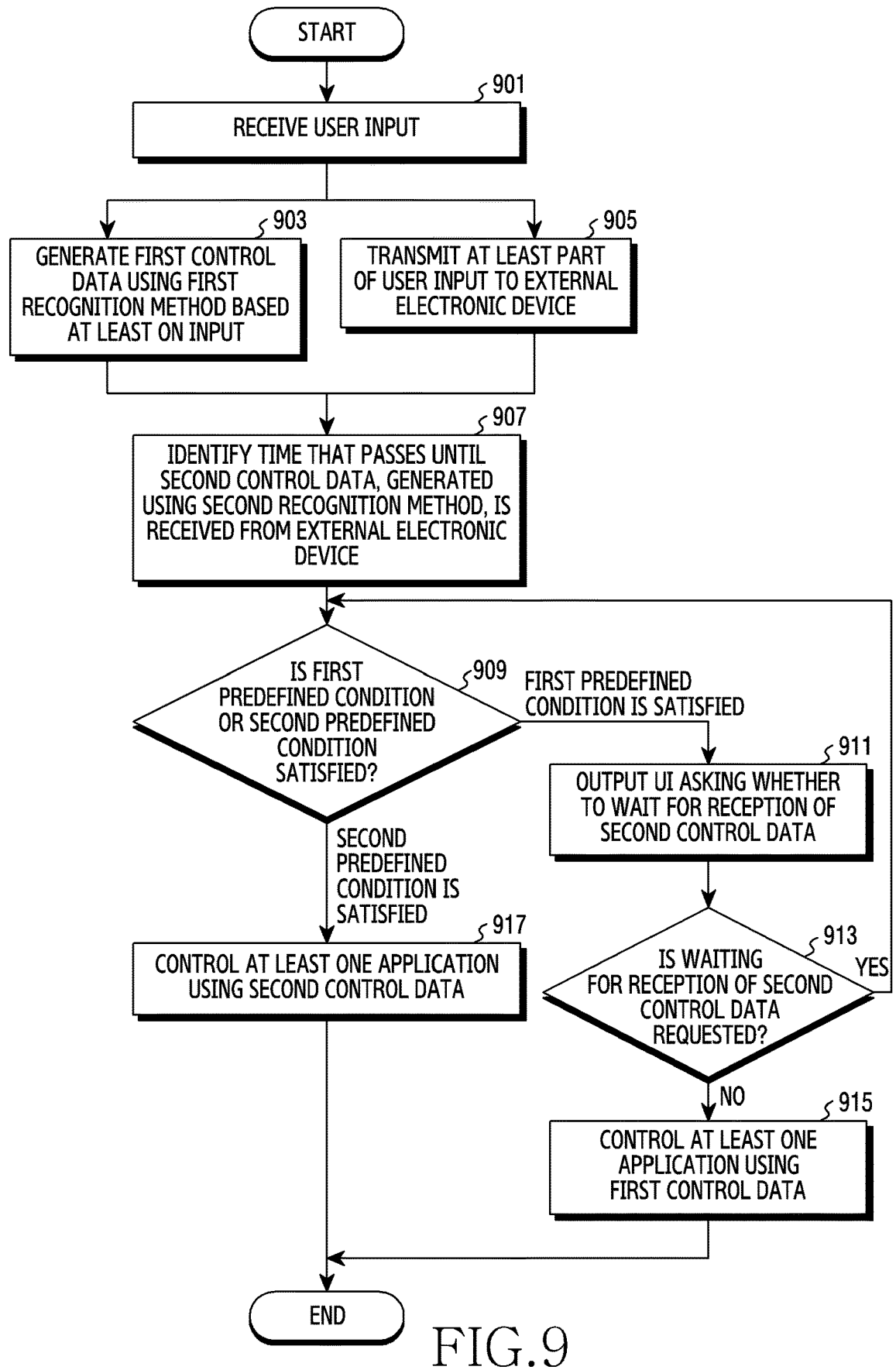
FIG. 9 is a flowchart illustrating an example control method of an electronic device according to an embodiment of the disclosure.

FIG. 9 is a flowchart illustrating an example control method of an electronic device according to an embodiment of the disclosure.

Referring to FIG. 9, a processor (the processor 320 of FIG. 3, or the processor 510 of FIG. 5) of the electronic device (for example, the electronic device 10 of FIG. 1, the electronic device 301 of FIG. 3, or the electronic device 500 of FIG. 5) according to an embodiment of the disclosure may perform operations 901, 903, 905, 907, 909, and 917 similar to operations 601, 603, 605, 607, 609, and 613 of FIG. 6.

When the first predefined condition is satisfied (for example, when the second control data is not received within the predefined time) as a result of determining in operation 909, the processor may control a display (for example, the display device 360 of FIG. 3) to display a user interface (UI) (for example, a pop-up window) asking whether the user will wait reception of the second control data in operation 911.

In operation 913, the processor according to an embodiment of the disclosure may determine whether waiting for reception of the second control data is selected (requested). For example, when "Yes" is selected on the pop-up window, the processor may recognize that waiting for reception of the second control data is requested.

When waiting for reception is selected as a result of determining in operation 913, the processor may proceed to operation 909. For example, the processor may wait for reception of the second control data the predefined time more. According to an example embodiment, the reception waiting time of the second control data may be different from the predefined time.

When waiting for reception is not selected as a result of determining in operation 913, the processor may control at least one application using the first control data in operation 915.

Figure 10:
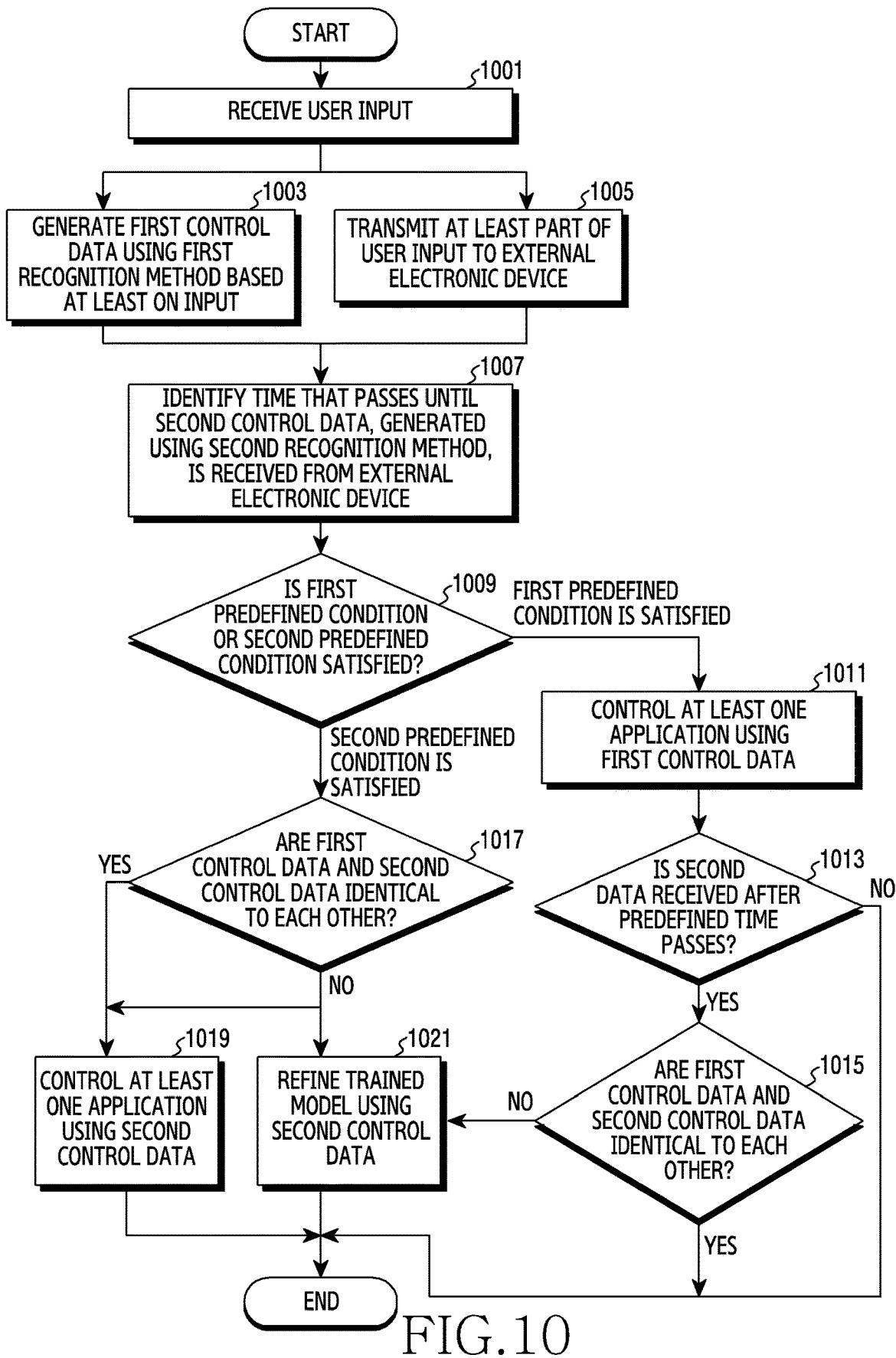
FIG. 10 is a flowchart illustrating an example control method of an electronic device according to an embodiment of the disclosure.

FIG. 10 is a flowchart illustrating an example control method of an electronic device according to an embodiment of the disclosure.

Referring to FIG. 10, a processor (the processor 320 of FIG. 3, or the processor 510 of FIG. 5) of the electronic device (for example, the electronic device 10 of FIG. 1, the electronic device 301 of FIG. 3, or the electronic device 500 of FIG. 5) according to an embodiment of the disclosure may perform operations 1001, 1003, 1005, 1007, and 1009 similarly to operations 601, 603, 605, 607, and 609 of FIG. 6.

When the first predefined condition is satisfied (for example, when the second control data is not received within the predefined time) as a result of determining in operation 1009, the processor may control at least one application using the first control data in operation 1011.

In operation 1013, the processor according to an embodiment of the disclosure may determine whether second control data is received after the predefined time passes. When the second control data is not received after the predefined time passes as a result of determining in operation 1013, the processor may finish the control operation of the electronic device. On the other hand, when the second control data is received after the predefined time passes as a result of determining in operation 1013, the processor may determine whether the first control data and the second control data are the same in operation 1015.

When the first control data and the second control data are the same as a result of determining in operation 1015, the processor may finish the control operation of the electronic device. On the other hand, when the first control data and the second control data are not the same as a result of determining in operation 1015, the processor may proceed to operation 1021, which will be described below.

When the second predefined condition is satisfied (for example, when the second control data is received within the predefined time) as a result of determining in operation 1009, the processor may determine whether the first control data and the second control data are the same in operation 1017.

When the first control data and the second control data are the same as a result of determining in operation 1017, the processor may proceed to operation 1019, which will be described below. On the other hand, when the first control data and the second control data are not the same as a result of determining in operation 1017, the processor may control at least one application using the second control data in operation 1019, and may refine a trained model (for example, the first trained model 13 of FIG. 1, or the trained model 523 of FIG. 5) using the second control data in operation 1021. For example, the processor may control a first recognition module (for example, the first recognition module 11 of FIG. 1, FIG. 2A, and FIG. 2B, or the recognition module 521 of FIG. 5) to refine the trained model using the second control data as training data.

According to various embodiments of the disclosure, a method of an electronic device (e.g., an electronic device 10, 301, or 500) may comprise receiving an input of a user, generating first control data for controlling at least one application among one or more applications using a first recognition method, based at least on the input, transmitting at least part of the input to an external electronic device (e.g., an external electronic device 20 or a server 308) through a communication module (e.g., a communication module 390 or 540), wherein the external electronic device is configured to generate second control data for controlling the at least one application using a second recognition method based at least on the input, identifying a time that passes until the second control data is received after the at least part of the input is transmitted to the external electronic device in response to the passing time satisfying a first predefined condition, controlling the at least one application using the first control data, and controlling the at least one application using the second control data in response to the passing time satisfying a second predefined condition.

According to various embodiments, the generating the first control data using the first recognition method may comprise generating the first control data using a first trained model (e.g., a first trained model 13, or a trained model 523) which is trained based at least on a first artificial neural network, and the generating the second control data using the second recognition method may comprise generating the second control data using a second trained model (e.g., a second trained model 23) which is trained based at least on a second artificial neural network.

According to various embodiments, the first predefined condition may comprise a condition in which the second control data is received after a predefined time passes, or the second control data is not received, and the second predefined condition may comprise a condition in which the second control data is received within the predefined time.

According to various embodiments, the method may further comprise identifying accuracy of the first control data, and adjusting the predefined time based at least on the accuracy of the first control data.

According to various embodiments, the method may further comprise determining whether the first control data and the second control data are identical to each other in response to the second control data being received after the predefined time passes, and refining the first trained model using the second control data as training data of the first recognition method when the first control data and the second control data are not identical to each other.

According to various embodiments, the method may further comprise determining whether the first control data and the second control data are identical to each other in response to the second predefined condition being satisfied, and in response to the first control data and the second control data not being identical to each other, controlling the at least one application using the second control data, and refining the first trained model using the second control data as training data of the first recognition method.

According to various embodiments, the method may further comprise displaying a user interface for receiving an input for requesting whether to wait for reception of the second control data based on the predefined time passing after the at least part of the input is transmitted to the external electronic device through the communication module, and in response to a request for waiting for reception being selected by the user through the user interface, waiting for reception of the second data more for the predefined time.

According to various embodiments, the method may further comprise identifying a communication state with the external electronic device, not transmitting the at least part of the user input to the external electronic device in response to the communication state satisfying a third predefined condition, and generating the first control data using the first recognition method.

Various embodiments of the disclosure can provide a result of analyzing a user input within a predetermined time, regardless of a communication (or network) state between the electronic device and the external electronic device, and/or a load state of the external electronic device, and may control an application or a function according to the result of analyzing.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While various example embodiments have been illustrated and described in the disclosure, it will be understood that the various example embodiments are intended to be illustrative, not limiting. Accordingly, one skilled in the art will understand that various changes in form and detail may be made without departing from the spirit and scope of the disclosure as defined, for example, in the appended claims.

What is claimed is:
1. An electronic device comprising:
a memory configured to store one or more applications;
a communication module comprising communication circuitry configured to communicate with an external electronic device; and
a processor,
wherein the processor is configured to control the electronic device to:
receive an input;
generate first control data for controlling at least one application among the one or more applications using a first recognition method based at least on the input;
transmit at least part of the input to the external electronic device through the communication module, wherein the external electronic device is configured to generate second control data for controlling the at least one application using a second recognition method based at least on the input;
identify accuracy of the first control data;
determine a reception waiting time of the second control data based on the identified accuracy of the first control data;
determine whether the second control data is received from the external electronic device within the determined reception waiting time;
control the at least one application using the first control data based on the determination satisfying a first predefined condition; and
control the at least one application using the second control data based on the determination satisfying a second predefined condition.

2. The electronic device of claim 1, wherein the first recognition method comprises a first trained model trained based at least on a first artificial neural network, and
wherein the second recognition method comprises a second trained model trained based at least on a second artificial neural network.

3. The electronic device of claim 1, wherein the processor is further configured to control the electronic device to:
determine that the first predefined condition is satisfied when the second control data is not received within the determined reception waiting time in response to the at least part of the input being transmitted to the external electronic device through the communication module; and
determine that the second predefined condition is satisfied when the second control data is received within the determine reception waiting time in response to the at least part of the input being transmitted to the external electronic device through the communication module.

4. The electronic device of claim 3, wherein the processor is further configured to control the electronic device to determine whether the first control data and the second control data are identical to each other in response to the second control data being received after the determined reception waiting time, and to refine the first trained model using the second control data as training data of the first recognition method based on the first control data and the second control data not being identical to each other.

5. The electronic device of claim 3, wherein the processor is further configured to control the electronic device to determine whether the first control data and the second control data are identical to each other in response to the second predefined condition being satisfied; and
control the at least one application using the second control data in response to the first control data and the second control data not being identical to each other, and to refine the first trained model using the second control data as training data of the first recognition method.

6. The electronic device of claim 3, further comprising a display,
wherein the processor is further configured to:
control the display to display a user interface providing an input for receiving a request whether to wait for reception of the second control data based on the reception waiting time passing after the at least part of the input is transmitted to the external electronic device through the communication module; and
wait for reception of the second data for greater than the reception waiting time in response to a request for waiting for reception being input through the user interface.

7. The electronic device of claim 1, wherein the processor is further configured to control the electronic device to identify a communication state with the external electronic device, and to not transmit the at least part of the user input to the external electronic device in response to the communication state satisfying a third predefined condition, and to generate the first control data using the first recognition method.

8. An electronic device comprising:
a communication module comprising communication circuitry configured to communicate with an external electronic device; and
a processor,
wherein the processor is configured to control the electronic device to:
receive an input;
generate first control data using a first recognition method based at least on the input;
transmit at least part of the input to the external electronic device through the communication module, wherein the external electronic device is configured to generate second control data using a second recognition method based at least on the input;
identify accuracy of the first control data;
determine a reception waiting time of the second control data based on the identified accuracy of the first control data;
determine whether the second control data is received from the external electronic device within the determined reception waiting time;
control a first predefined function using the first control data based on the determination satisfying a first predefined condition; and
control a second predefined function using the second control data based on the determination satisfying a second predefined condition.

9. The electronic device of claim 8, wherein the first recognition method comprises a first trained model trained based at least on a first artificial neural network, and
wherein the second recognition method comprises a second trained model trained based at least on a second artificial neural network.

10. The electronic device of claim 9, wherein, the processor is further configured to control the electronic device to control the second predefined function using the second control data based on the first control data and the second control data not being identical to each other, and to refine the first trained model using the second control data as training data of the first recognition method.

11. The electronic device of claim 8, wherein the first predefined function and the second predefined function are identical to each other.

12. A method of operating an electronic device, the method comprising:
receiving an input;
generating first control data for controlling at least one application among one or more applications using a first recognition method, based at least on the input;
transmitting at least part of the input to an external electronic device through a communication module, wherein the external electronic device generates second control data for controlling the at least one application using a second recognition method based at least on the input;
identifying accuracy of the first control data;
determining a reception waiting time of the second control data based on the identified accuracy of the first control data;
determining whether the second control data is received from the external electronic device within the determined reception waiting time;
controlling the at least one application using the first control data in response to the determination satisfying a first predefined condition; and
controlling the at least one application using the second control data in response to the determination satisfying a second predefined condition.

13. The method of claim 12, wherein generating the first control data using the first recognition method comprises generating the first control data using a first trained model trained based at least on a first artificial neural network, and wherein generating the second control data using the second recognition method comprises generating the second control data using a second trained model trained based at least on a second artificial neural network.

14. The method of claim 12, wherein the first predefined condition comprises a condition in which the second control data is not received within the determined reception waiting time, and wherein the second predefined condition comprises a condition in which the second control data is received within the determined reception waiting time.

15. The method of claim 14, further comprising:
determining whether the first control data and the second control data are identical to each other in response to the second control data being received after the reception waiting time passes; and
refining the first trained model using the second control data as training data of the first recognition method based on the first control data and the second control data not being identical to each other.

16. The method of claim 14, further comprising:
determining whether the first control data and the second control data are identical to each other in response to the second predefined condition being satisfied; and
controlling the at least one application using the second control data in response to the first control data and the second control data not being identical to each other, and refining the first trained model using the second control data as training data of the first recognition method.

17. The method of claim 14, further comprising:
displaying a user interface providing an input for requesting whether to wait for reception of the second control data based on the reception waiting time passing after the at least part of the input is transmitted to the external electronic device through the communication module; and
waiting for reception of the second data for greater than the reception waiting time in response to a request for waiting for reception being received through the user interface.

18. The method of claim 12, further comprising:
identifying a communication state with the external electronic device; and
not transmitting the at least part of the user input to the external electronic device in response to the communication state satisfying a third predefined condition, and generating the first control data using the first recognition method.

* * * * *